United States Patent Office 3,215,712
Patented Nov. 2, 1965

3,215,712
PROCESS FOR THE PRODUCTION OF CYCLIC ORGANIC COMPOUNDS
Karl W. Hübel, Brussels, Belgium, assignor to Union Carbide Corporation, a corporation of New York
No Drawing. Filed Mar. 22, 1961, Ser. No. 97,460
Claims priority, application Great Britain, Jan. 18, 1957, 1,857/57
13 Claims. (Cl. 260—396)

This application is a continuation-in-part of copending application Serial No. 707,111 filed January 6, 1958, and now abandoned.

This invention relates to the preparation of organic compounds and to products resulting therefrom. More particularly, it relates to a process for the preparation of five, six, or seven membered unsaturated cyclic compounds.

The present invention facilitates the synthesis of substituted or unsubstituted cyclic organic compounds in that it provides a new and general one-step method for this purpose. The invention is predicated upon the discovery, initially disclosed in the aforesaid application, SN 707,111, that when certain organo-metallic complexes, as hereinafter described, are thermally decomposed cyclic compounds such as five, six or higher membered ketones, or substituted benzenic compounds and the like may be produced.

According to this invention, the process for the preparation of 5, 6 and 7 membered unsaturated cyclic organic compounds comprises heating an organo-metallic π complex having the formula: $M_x(CO)_y(RC_2R)_z(Hg)_w$ wherein M represents a transition metal belonging to the VI, VII or VIII sub groups of the Periodic Table, CO represents a carbonyl group, the R groups may be the same or different and each R represents hydrogen, halogeno, carboalkoxy, alkyl, aryl, cycloaliphatic, alkoxy or silyl groups and the like, including the substituted derivatives thereof, $C_2$ represents a carbon to carbon bonding, $x$ represents an integer of from 1 to 4, $y$ represents an integer of from 1 to 10, $z$ represents an integer of from 2 to 6, and $w$ represents an integer from 0 to 3; to the dissociation temperature of the π bond between the metal atom and the organic ligand $(RC_2R)$.

For the purposes of this invention, the heating of the indicated complexes whereby the organic ligand splits off will be termed "decomposition." However, it is to be understood that this invention envisions only that limited decomposition whereby the π bond between the metal atom and the organic ligand is thermally broken, thereby resulting in the formation of separable products, including the aforesaid 5, 6 and 7 membered cyclic compounds.

Typical organo-metallic complexes suitable for use in the process of this invention include:

$Fe_2(CO)_6(RC_2R)_2$, wherein one R represents a phenyl or ethyl or phenyl ethyl group and wherein the other R represents a phenyl, methyl, ethyl, or methoxy group or a halogen atom. This complex may be represented by the following structure:

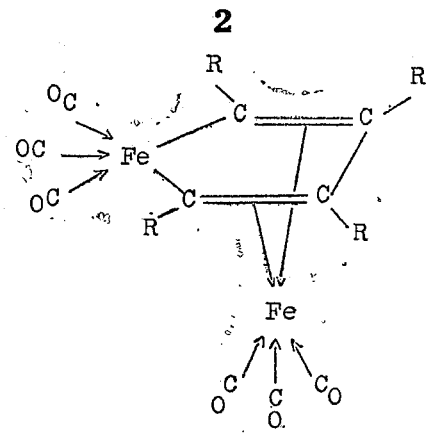

$Fe_2(CO)_7(RC_2R)_2$, wherein one R is a phenyl or phenyl ethyl group and the other R represents a phenyl group. This complex may be represented by the following structure:

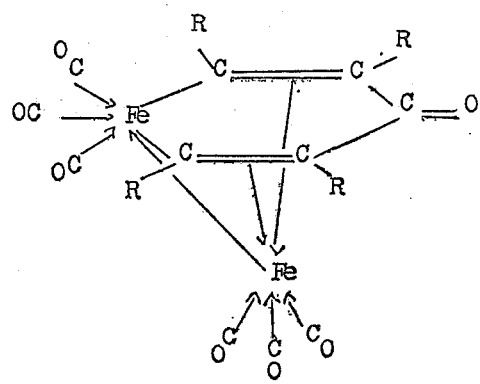

$Fe(CO)_4(RC_2R)_2$, wherein one R represents a phenyl group and wherein the other R represents a phenyl group or a methyl group. This complex may be represented by the following structure:

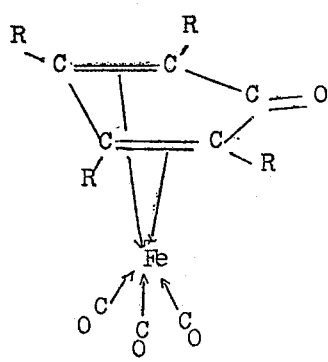

$Fe_3(CO)_8(RC_2R)_2$, wherein both R groups represent phenyl groups. This complex may be represented by the following structure:

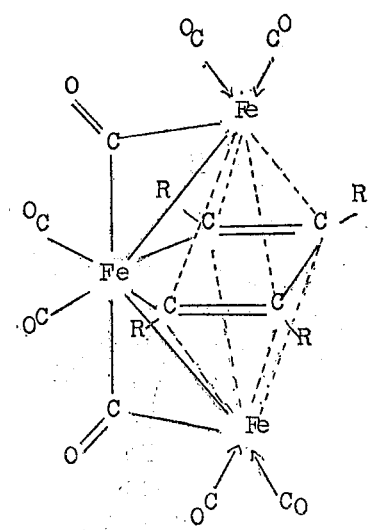

$Fe_2(CO)_6(RC_2H)_3$, wherein R represents a phenyl group. This complex may be represented by the following structure:

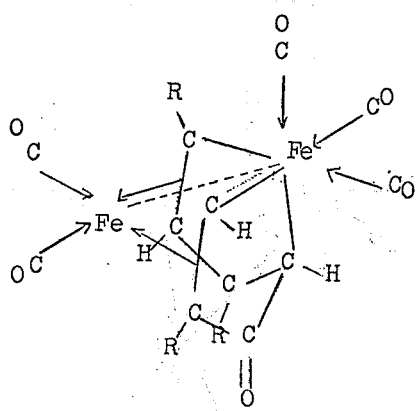

$Fe(CO)_4(RC_2H)_3$, wherein R represents a phenyl group or a hydrogen atom. This complex may be represented by the following structure:

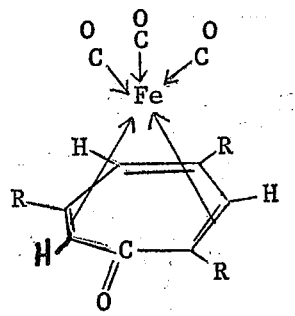

$Co_2(CO)_4(RC_2R')_3$, wherein R represents a carboethoxy or methyl group or a hydrogen atom and wherein R' represents a phenyl group or a tertiary-butyl group. This complex may be represented by the following structure:

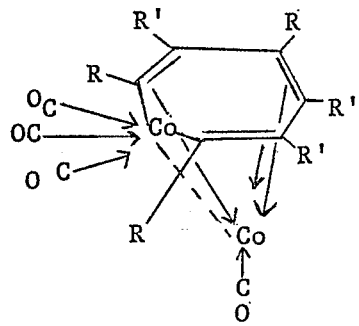

$Co_2(CO)_6(RC_2H)_4Hg$, wherein R represents a tertiary butyl or trimethylsilyl group. This complex may be represented by the following structure:

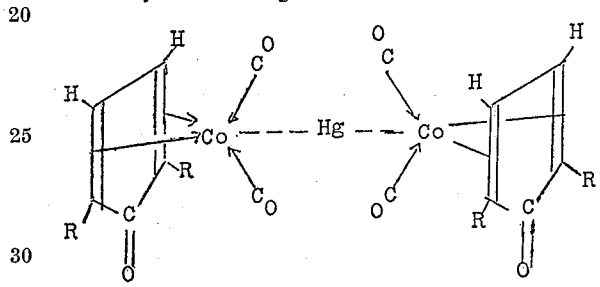

$Co_2(CO)_6(RC_2H)_4$, wherein R represents a tertiary butyl or trimethylsilyl group. This complex may be represented by the following structure:

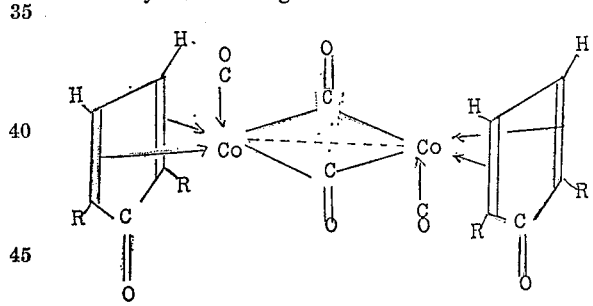

$Ni(CO)_2(RC_2R)_4$, wherein both R groups represent phenyl groups. This complex may be represented by the following structure:

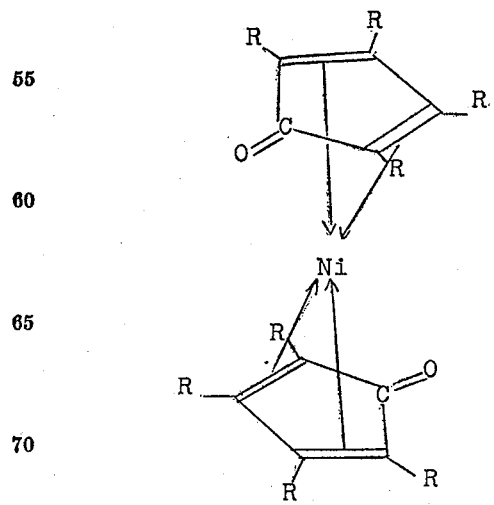

$Fe(CO)_5(RC_2R)_2$ wherein each R is a lower alkyl such as a methyl or ethyl group or an aryl group, such as a phenyl group. This may be represented by the following structure:

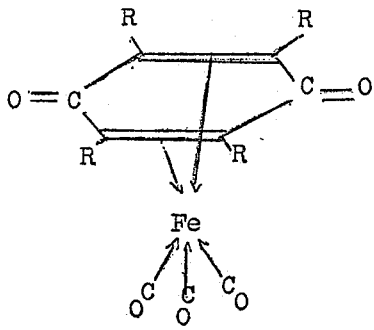

and, $Mo_2(CO)_4(\phi C_2\phi)_5$, where $\phi$ represents the phenyl group.

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arsine, or a substituted phosphine.

The organo-metallic complexes employed as starting materials in the present invention may be conveniently prepared by the process described in the aforementioned application Serial No. 707,111 entitled "Organo-Metallic Compounds and Method for Their Preparation," filed January 6, 1958, in the name of Karl Walter Hubel, the description thereof being incorporated herein by reference.

Briefly stated, the organo-metallic complexes can be prepared by reacting an acetylenic compound with a metal carbonyl in a non-aqueous neutral medium at a temperature of between room and 300° C. The acetylenic reactant has the formula $RC\equiv CR$, wherein each of the R groups is selected from the group consisting of hydrogen and alkyl, alkenyl, aryl, cycloaliphatic, alkaryl, aralkyl radicals and their substituted derivatives; halogen atoms and —CHO, —CN, —OH, $NR_2$ and —COOR radicals wherein R is a member selected from the group consisting of hydrogen, aliphatic and aromatic groups; and organo-substituted hydrides, the substituents being substantially inert to and inactive with the carbonyl group of the metal carbonyl reactant. The metals of the metal carbonyl are selected from the group consisting of iron, nickel, ruthenium, rhodium, palladium, osmium, iridium, platinum, manganese, rhenium, chromium, molybdenum, cobalt and tungsten.

As indicated, above, the π-complexes which comprise the starting materials for the process of this invention include a ring system consisting of carbon atoms or a hetero ring system in which the hetero atom is an atom of a transition metal. When a complex belonging to the first category is decomposed under the conditions of the present invention, the inorganic parts of the molecule split off and the ring system readily becomes isolatable. For example, when the complexes $$Fe(CO)_4(C_6H_5C_2C_6H_5)_2$$

or $Ni(CO)_2(C_6H_5C_2C_6H_5)_4$ are decomposed, the ring system, which in this case is the stable tetraphenylcyclopentadienone, is liberated and can easily be isolated in high yield. Other examples illustrating this embodiment of the invention are the production of tropone from the decomposition of the complex $Fe(CO)_4(HC_2H)_3$, and 2,4,6 triphenyltropone from the decomposition of the complex $Fe(CO)_4(C_6H_5C_2H)_3$.

When the complex structure contains a ring formed by the inclusion of a metal atom therein, as for example in the complex $Fe_2(CO)_6(C_6H_5C_2C_6H_5)_2$, the splitting of the π bonds between the metal or metals not contained in the ring and the ring system, results in the formation of a cyclic compound stabilized by the introduction of a donor ligand, i.e. a carbonyl group, obtained from the original complex. Thus from the complex $$Fe_2(CO)_6(C_6H_5C_2C_6H_5)_2$$

tetraphenylcyclopentadienone is also obtained. Another example of this behavior is the decomposition of the complex $Co_2(CO)_4[(CH_3)_3CC_2H]_3$, wherein the organic part stabilizes itself by ring closure and leads to the formation of 1,2,4 tri(t.butyl) benzene.

The "decomposition" as employed in the subject invention, is generally performed by heating the complex, either as such or in solution, to its π bond dissociation temperature. Alternatively the same "decomposition" may be effected by subjecting the reaction mixture to the irradiation of ultra-violet light. The temperature at which the decomposition is carried out ranges from about 40 to about 300° C.

In the process of this invention, the solvents in which the decomposition may be carried out are either of the polar or non-polar type. Such solvents include benzene, petroleum ether, ether, tetrahydrofuran, dioxane, alcohol, carbon tetrachloride, beta-ethoxy-ethanol and the like. It is preferable to perform the reaction in a closed system whenever the reactant or the reaction product formed thereby or the solvent employed, are too volatile at the reaction temperature.

The thermal decomposition of the complexes is substantially facilitated when the reaction is performed in the presence of certain substances which for the purposes of this invention shall be termed (decomposition) activators. The latter facilitates the elimination of the inorganic part, i.e. the metal, from the molecule. As a consequence, a substantially increased yield in the desired organic product is generally obtained. In addition, the use of the activators has the further advantage of enabling the decomposition to be carried out at considerably lower temperatures.

Useful activators include ferric chloride, $SO_2Cl_2$, $NCl_3$, $HNO_2$, para-toluenesulfondichloramide, tertiary phosphines, arsines or stibines, di-tertiary phosphines, arsines or stibines, and phosphites such as trimethyl-phosphite, triphenylphosphite and the like. When using an activator, the decomposition temperature generally ranges from about —30° C. to about 150° C. For the practice of this invention, the amount of activator employed must be no larger than that required to react with the non-ring included π bonded metal atom of the complex, i.e. it should be no larger than stoichiometric with respect to that metal atom or atoms. This stoichiometric amount of activator may be expressed as up to 1 gram mole of activator per gram atom of π bonded metal atom. When the amount of activator is much smaller than this stoichiometric amount, it is advisable to repeat the reaction several times until the conversion of the complex is completed. It should be noted that when the indicated amounts of activator are used to effect the decomposition, its result is limited to the elimination of the inorganic part of the molecule, i.e. there is no interaction between the organic part and the activator. In other words, the cyclic organic compound resulting from the liberation of the organic part of the complex molecule does not contain an element or group extraneous to that molecule.

The reaction is usually completed within a few hours, although longer reaction times may be necessary in some instances. The reaction products are easily removable from the reaction mixture after completion of the reaction using any suitable technique. The technique of removal will of course vary according to the reaction product. Suitable process conditions will be further illustrated in the specific examples hereinafter described relating to the present invention.

Typical compounds prepared by the process of this invention may be illustrated by the following general formulae:

Group A

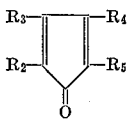

wherein $R_2$, $R_3$, $R_4$ and $R_5$ represent a $C_6H_5$ group or a $C_6H_4Cl$ group; or wherein $R_2$ and $R_5$ represent a $C_6H_5$ group and $R_3$ and $R_4$ represent a hydrogen atom; or wherein $R_2$ and $R_5$ represent a $Si(CH_3)_3$ group and $R_3$ and $R_4$ represent a hydrogen atom;

Group B

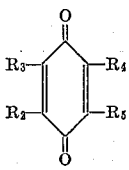

wherein $R_2$, $R_3$, $R_4$, and $R_5$ represent a $C_6H_5$, $CH_3$ or $C_2H_5$ group.

Group C

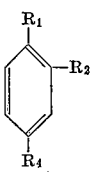

wherein $R_1$, $R_2$, and $R_4$ represent a $C(CH_3)_3$ group.

Group D

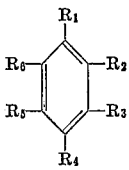

wherein $R_1$, $R_3$ and $R_5$ represent a $C_6H_5$ group; and $R_2$, $R_4$ and $R_6$ represent a hydrogen atom; or wherein $R_2$, $R_4$, $R_6$ represent a $COOCH_3$ or $COOC_2H_5$ group and $R_1$, $R_3$ and $R_5$ represent a $C_6H_5$ group; or wherein $R_1$, $R_2$, $R_3$, $R_4$, $R_5$ and $R_6$ represent a $COOCH_3$ group.

Group E

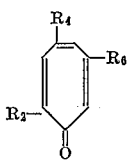

wherein $R_2$, $R_4$, and $R_6$ represent a hydrogen atom; or wherein $R_2$, $R_4$ and $R_6$ represent a $C_6H_5$ or a $C_6H_4Br$ group.

Therefore, the subject invention provides a simple method of producing unsaturated cyclic organic compounds in excellent yield. It is particularly suitable for the preparation of tropone, the preparation of which being heretofore a difficult procedure. In this regard, for the preparation of tropones, the subject process should be carried out in the presence of an activator such as a tertiary phosphine, e.g. triphenyl phosphine, or a chloride of a metal reducible to a lower valence state, e.g. ferric chloride.

The subject invention is also uniquely suited for the preparation of unusual compounds such as 1,2,4 tri-tertiary butyl benzene, the synthesis of which being heretofore unsuccessful. As indicated previously, the latter compound can be conveniently prepared by the decomposition of the complex $Co_2(CO)_4[C(CH_3)_3C_2H]_3$. This decomposition can be achieved by heating the complex, e.g. at a temperature of about 120° C. in an organic solvent such as petroleum ether or benzene. A 50% yield is obtained.

The cobalt complex useful in the production of the 1,2,4 tri-ter-butyl benzene compound discussed above is readily prepared by reacting either $$Co_2(CO)_6[C(CH_3)_3C_2H]$$

or $Co_4(CO)_{10}[C(CH_3)_3C_2H]$ with $C(CH_3)_3$—C≡C—H. It should be noted that the decomposition of the complex $Co_2(CO)_4(RC_2R')_3$ wherein $R'$ is a phenyl and $R$ is a —$COOCH_3$, —$COOC_2H_5$, or —$CH_3$ group, exclusively yields the symmetric 1,3,5 benzene derivative.

The invention may be further illustrated by the following examples:

*Example 1*

Decomposition of 0.5 gram of the complex $$Fe_2(CO)_6(C_6H_5C_2C_6H_5)_2$$

dissolved in 50 ml. benzene was achieved by exposing the reaction vessel to sunlight for a period of 24 hours. 63% of the complex was decomposed by this procedure and yielded 70% of tetraphenylcyclopentadienone.

*Example 2*

Decomposition of 2 grams of the complex $$Fe_2(CO)_7(C_6H_5C_2C_6H_5)_2$$

dissolved in 100 ml. of benzene was achieved by boiling the mixture under reflux for 2 hours. The filtered solution yielded after chromatography 0.15 gram (13% yield) of tetraphenylcyclopentadienone.

*Example 3*

Decomposition of 0.2 gram $Fe(CO)_4(C_6H_5C_2C_6H_5)_2$ was achieved by heating the complex to its melting point (about 180° C.) for 15 minutes; the reaction mixture was thereupon extracted with hot benzene. The filtrate, after concentration and addition of a fourfold amount of methanol, gave tetraphenylcyclopentadienone in a high yield.

*Example 4*

A sample of about 0.1 gram $Ni(CO)_2(C_6H_5C_2C_6H_5)_4$ was heated to about 260–270° C. whereupon decomposition occurred. Following the procedure of Example 3, tetraphenylcyclopentadienone was obtained in good yield.

*Example 5*

Decomposition of 2.5 grams (0.01 mole)

$$Fe(CO)_4(HC_2H)_3$$

dissolved in 15 ml. of benzene and to which 6.4 grams (0.024 mol) triphenylphosphine had been added, was achieved by heating the mixture in a sealed tube for 5 hours at about 100° C. $Fe(CO)_3[P(C_6H_5)_3]$ was filtered off. The filtrate was passed over a column of activated $Al_2O_3$. The fraction eluted with ethyl acetate yielded upon concentration a light yellow oil identified by its I.R. spectrum as being tropone. The yield was about 35%.

*Example 6*

The decomposition of 0.72 gram (1.52 mM.) of $$Fe(CO)_4(C_6H_5C_2H)_3$$

to which 0.82 gram (3.13 mM.) of triphenylphosphine had been added was achieved by heating the mixture in 10 ml. benzene in a sealed tube at 100° C. for 6 hours. After cooling, 0.98 gram (98% yield)

$$Fe(CO)_3[P(C_6H_5)_3]_2$$

was filtered off. The filtrate yielded, after chromatography, 0.41 gram (82% yield) 2,4,6-triphenyl-tropone, a yellow-greenish compound having a M.P. of 136–129° C. Its I.R. spectrum was in accord with such a structure. This compound was further characterized by the formation of a violet 2,4-dinitro-phenyl-hydrazone of M.P. 237–238° C.

*Analysis.*—Found (calc. for $C_{31}H_{22}B_4O_2$): C, 72.20 (theoretical 72.35); H, 4.37 (theoretical 4.31); N, 10.33 (theoretical 10.89).

*Example 7*

1 gram (1.7 mM.) of the complex

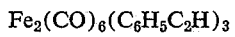
$Fe_2(CO)_6(C_6H_5C_2H)_3$ was dissolved in a mixture of 100 ml. dioxane and 10 ml. $H_2O$. To remove the inorganic part of the complex, 1.84 grams (6.8 mM.) of $FeCl_3$ and 2.5 ml. of conc. HCl were added and the reaction mixture refluxed (at a temperature of 100° C.) for a period of 30 minutes. Water was then added and extraction with $CH_2Cl_2$ yielded 0.23 gram (40% yield) of 2,4,6 triphenyltropone (M.P. 124–126° C.).

*Example 8*

Decomposition of 0.1 gram of

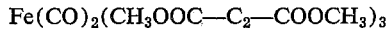
$Fe(CO)_2(CH_3OOC\text{---}C_2\text{---}COOCH_3)_3$ was achieved by heating the complex in a sublimator at 145° C. for a short period. The apparatus was then evacuated and the hexamethyl ester of mellitic acid was separated in good yields by sublimation.

*Example 9*

0.1 gram $Fe(CO)_4(C_6H_5C_2H)_3$ was placed in a sublimator and heated at 160° C. in vacuum, whereby decomposition occurred. 1,3,5-triphenyl-benzene in about 80% yield was isolated from the reaction products.

*Example 10*

Following the procedure of Example 9,

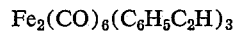
$Fe_2(CO)_6(C_6H_5C_2H)_3$ was thermally decomposed at 170° C. to yield 1:3:5-triphenylbenzene.

*Example 11*

Decomposition of 0.06 gram of

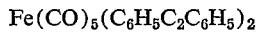
$Fe(CO)_5(C_6H_5C_2C_6H_5)_2$ was effected by heating the complex to its decomposition temperature (220° C.). Tetraphenyl.p.quinone (M.P. 320° C.) in almost quantitative yield, was obtained thereby from the reaction products.

The compounds produced by the process of this invention generally have art-recognized utility and/or serve as intermediates in the production of compounds having a wide range of art-recognized utility.

For example, the substituted benzenic compounds of this invention are useful as solvents. In addition, the substituted benzenic compounds are useful in the production of insecticides, germicides, and the like. The cyclic ketones are useful as intermediates in many syntheses such as the synthesis of Fulvenes. The are also useful as starting materials for the production of organo-metallic complexes and in particular π complexes. It is also well known that quinones are easily transformed into hydroquinones which are useful as anti-oxidants and as compounds in photograph formulate. Tropones are generally useful in the synthesis of natural products containing 7-membered ring systems.

1,2,4-tri-ter-butyl-benzene is useful as a high energy fuel since the energy contained in its configuration is much higher than that of the corresponding symmetric derivatives. Theoretical considerations have indicated that the presence of the ter-butyl substituents in ortho position increases the heat of combustion by about 25 kilocalories. This compound may also be used in anti-knock systems.

What is claimed is:

1. A process for the preparation of five, six and seven membered unsaturated cyclic compounds which comprises decomposing an organo-metallic pi-complex having the formula:

$M_x(CO)_y(RC_2R)_z(Hg)_w$ wherein M is a transition metal selected from the class consisting of Sub-Groups VI, VII and VIII of the Periodic Table; CO represents a carbonyl group; each R group is selected from the class consisting of hydrogen, monovalent hydrocarbon, halogeno, carboalkoxy, alkoxy and trialkylsilyl groups; $C_2$ represents a carbon-to-carbon bonding; $x$ is an integer having a value from 1 to 4; $y$ is an integer having a value from 1 to 10; $z$ is an integer having a value from 2 to 6; $w$ has the value zero when $x$ is 1 and $w$ has a value from zero to 1 when $x$ has a value from 2 to 4; said organo-metallic pi-complex comprising at least one metal M pi-bonded to from one to 2 rings, each ring having at least five members and comprising (a) at least four carbon atoms designated $C_2$ in said $RC_2R$ moieties, (b) the carbon atoms of from zero to 2 carbonyl groups, and (c) from zero to 1 metals M; any carbonyl groups not included in said rings being bonded to metals M; and said mercury being bonded to two metals M which are in turn pi-bonded to said rings; said decomposition being effected by heating said pi-complex at a temperature between about 40° C. and 300° C.

2. A process according to claim 1, in which the metal of the organo-metallic complex is iron and $w$ is zero.

3. A process according to claim 1, in which the metal of the organo-metallic complex is cobalt and $w$ is zero.

4. A process according to claim 1, in which the metal of the organo-metallic complex is nickel and $w$ is zero.

5. A process according to claim 1, in which the metal of the oragno-metallic complex is molybdenum and $w$ is zero.

6. A process according to claim 1, in which the reaction is carried out in an organic solvent selected from the group consisting of benzene, petroleum ether, ether, tetrahydrofuran, carbon tetrachloride and beta-ethoxyethanol.

7. A process for the preparation of five, six and seven membered unsaturated cyclic compounds which comprises decomposing an organo-metallic pi-complex having the formula:

$M_x(CO)_y(RC_2R)_z(Hg)_w$ wherein M is a transition metal selected from the class consisting of Sub-Groups VI, VII and VIII of the Periodic Table; CO represents a carbonyl group; each R group is selected from the class consisting of hydrogen; monovalent hydrocarbon, halogeno, carboalkoxy, alkoxy and trialkylsilyl groups; $C_2$ represents a carbon-to-carbon bonding; $x$ is an integer having a value from 1 to 4; $y$ is an integer having a value from 1 to 10; $z$ is an integer having a value from 2 to 6; $w$ has the value zero when $x$ is 1 and $w$ has a value from zero to 1 when $x$ has a value from 2 to 4; said organo-metallic pi-complex comprising at least one metal M pi-bonded to from one to 2 rings, each ring having at least five members and comprising (a) at least four carbon atoms designated $C_2$ in said $RC_2R$ moieties, (b) the carbon atoms of from zero to 2 carbonyl groups, and (c) from zero to 1 metals M; any carbonyl groups not included in said rings bonded to metals M; and said mercury being bonded to two metals M which are in turn pi-bonded to said rings; said decomposition being effected by maintaining a mixture of said pi-complex and an activator selected from the group consisting of FeCl₃, SO₂Cl₂, NCl₃, HNO₂, paratoluenesulfondichloramide, triphenylphosphine, trimethylphosphite and triphenylphosphite at a temperature between about −30° C. and about 150° C.

8. A process for the preparation of five, six and seven membered unsaturated cyclic compounds which comprises decomposing an organo-metallic pi-complex having the formula:

$$M_x(CO)_y(RC_2R)_z(Hg)_w$$

wherein M is a transition metal selected from the class consisting of Sub-Groups VI, VII and VIII of the Periodic Table; CO represents a carobnyl group; each R group is selected from the class consisting of hydrogen, monovalent hydrocarbon, halogeno, carboalkoxy, alkoxy and trialkylsilyl groups; C₂ represents a carbon-to-carbon bonding; $x$ is an integer having a value from 1 to 4; $y$ is an integer having a value from 1 to 10; $z$ is an integer having a value from 2 to 6; $w$ has the value zero when $x$ is 1 and $w$ has a value from zero to 1 when $x$ has a value from 2 to 4; said organo-metallic pi-complex comprising at least one metal M pi-bonded to from one to 2 rings, each ring having at least five members and comprising (a) at least four carbon atoms designated C₂ in said RC₂R moieties, (b) the carbon atoms of from zero to 2 carbonyl groups, and (c) from zero to 1 metals M; any carbonyl groups not included in said rings being bonded to metals M; and said mercury being bonded to two metals M which are in turn pi-bonded to said rings; said decomposition being effected by subjecting said pi-complex to ultraviolet light.

9. A process for the preparation of tropone which comprises maintaining an organo-metallic complex having the formula

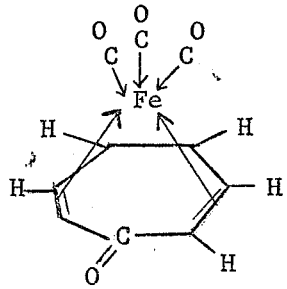

and an activator selected from the group consisting of FeCl₃, SO₂Cl₂, NCl₃, HNO₂, para-toluenesulfondichloramide, triphenylphosphine, trimethylphosphine, and triphenylphosphite at a temperature between about −30° C. and about 150° C.

10. A process for the preparation of 2,4,6-triphenyl tropone which comprises maintaining an organo-metallic complex having the formula

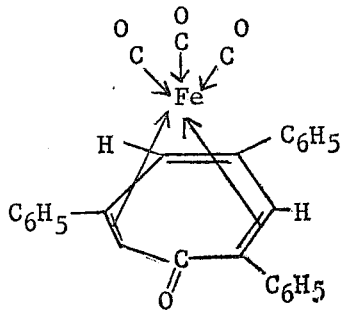

and an activator selected from the group consisting of FeCl₃, SO₂Cl₂, NCl₃, HNO₂, para-toluenesulfondichloramide, triphenylphosphine, trimethylphosphite, and triphenylphosphite at a temperature between about −30° C. and about 150° C.

11. A process for the preparation of tetraphenyl-paraquinone which comprises heating an organo-metallic complex having the formula

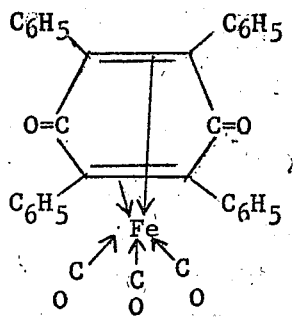

at a temperature between about 40° C. and about 300° C.

12. A process for the preparation of a substituted benzenic compound having the formula:

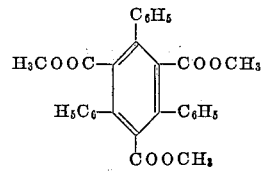

which comprises heating an organo-metallic complex having the formula

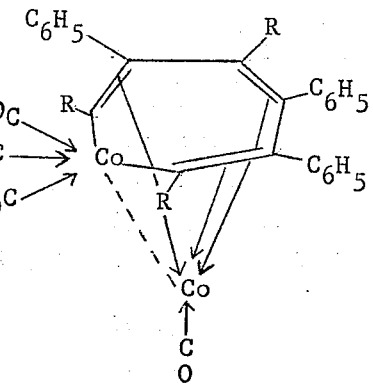

wherein R is the carbomethoxy group COOCH₃, at a temperature between about 40° C. and about 300° C.

13. A process for the production of 1,2,4-tritertiary-butyl benzene which comprises heating an organo-metallic complex having the formula

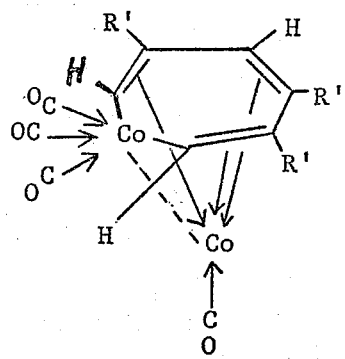

wherein R′ is the tertiary-butyl group, at a temperature between about 40° C. and about 300° C.

References Cited by the Examiner

UNITED STATES PATENTS

| | | | |
|---|---|---|---|
| 2,239,250 | 4/41 | Robinson | 260—586 |
| 2,387,587 | 10/45 | Hunsdiecker | 260—586 |
| 2,493,009 | 1/50 | McBee et al. | 260—586 |
| 2,856,414 | 10/58 | Robeson et al. | 260—396 |
| 2,863,923 | 12/58 | Bortnick | 260—586 |
| 2,905,674 | 9/59 | Filbey | 260—396 |
| 2,927,932 | 3/60 | Preston | 260—396 |
| 2,993,939 | 7/61 | Raley et al. | 260—668 |
| 2,994,725 | 8/61 | Shaw et al. | 260—668 |
| 2,998,463 | 8/61 | Meriwether et al. | 260—668 |
| 2,999,120 | 9/61 | Wilgus | 260—668 |
| 3,004,062 | 10/61 | Kreps | 260—475 |
| 3,007,959 | 11/61 | Meyer | 260—475 |

OTHER REFERENCES

Greenfield et al.: J. Am. Chem. Soc., vol. 78, pp. 120–4 (1956), QD 1. A5.

LORRAINE A. WEINBERGER, *Primary Examiner.*

IRVING MARCUS, LEON ZITVER, *Examiners.*